US008575849B2

(12) United States Patent
Simi

(10) Patent No.: US 8,575,849 B2
(45) Date of Patent: Nov. 5, 2013

(54) RESONATE DRIVER FOR SOLID STATE LIGHT SOURCES

(75) Inventor: Victor M. Simi, Lexington, KY (US)

(73) Assignee: Osram Sylvania Inc., Danvers, MA (US)

( * ) Notice: Subject to any disclaimer, the term of this patent is extended or adjusted under 35 U.S.C. 154(b) by 362 days.

(21) Appl. No.: 13/183,543

(22) Filed: Jul. 15, 2011

(65) Prior Publication Data

US 2013/0015776 A1 Jan. 17, 2013

(51) Int. Cl.
*H05B 37/02* (2006.01)

(52) U.S. Cl.
USPC ........... 315/219; 315/225; 315/247; 315/278; 315/308

(58) Field of Classification Search
USPC ............. 315/209 R, 219, 223, 225, 247, 276, 315/278, 283, 291, 308
See application file for complete search history.

(56) References Cited

U.S. PATENT DOCUMENTS 6,952,354 B1 10/2005 Yang et al.
7,990,070 B2 * 8/2011 Nerone ......................... 315/247
2008/0278985 A1 11/2008 Ribarich
2011/0309760 A1 * 12/2011 Beland et al. ................. 315/201
2012/0319588 A1 * 12/2012 Sid ................................ 315/129

FOREIGN PATENT DOCUMENTS

GB 2 426 836 A 12/2006
WO 2010/027493 A2 3/2010

OTHER PUBLICATIONS

Hans Bagge AF Berga, International Search Report and Written Opinion of the International Searching Authority for PCT/US12/44479, Sep. 26, 2012, pp. 1-11, European Patent Office, Rijswijk, The Netherlands.

AN2590 Application Note 20 W dimmable CFL ballast solution, Oct. 2007, pp. 1-17, STMicroelectronics, Geneva, Switzerland.

Hang-Seok Choi, Application Note AN-4151 Half-bridge LLC Resonant Converter Design Using FSFR-series Fairchild Power Switch (FPS-TM), Oct. 9, 2007, pp. 1-17, Fairchild Semiconductor Corporation, San Jose, California, United States of America.

* cited by examiner

*Primary Examiner* — Thuy Vinh Tran
(74) *Attorney, Agent, or Firm* — Shaun P. Montana

(57) ABSTRACT

A driver circuit, solid state light (SSL) source assembly including same, and a method of driving an SSL source are provided. The driver circuit includes a rectifier, an inverter, a transformer, a PFC circuit, and a frequency control. The rectifier receives an AC voltage and provides an unregulated DC voltage. The inverter includes two switches, and receives respective control signals to operate these, to generate a resonate AC signal from the unregulated DC voltage. The transformer includes a primary winding coupled to the inverter, a secondary winding to be coupled to an SSL source through an output stage, and a feedback winding. The PFC circuit controls the inverter in response to signals representative of the unregulated DC voltage and the inverter's current. The frequency control generates the control signals to control the inverter's switching frequency in response to signals representative of the output stage's current and the feedback winding's current.

19 Claims, 7 Drawing Sheets

400

RESONATE DRIVER FOR SOLID STATE LIGHT SOURCES

TECHNICAL FIELD

The present invention relates to electronics, and more specifically, to a driver for solid state light sources.

BACKGROUND

The development of high-brightness solid state light sources, such as light emitting diodes (LEDs) and the like, has led to use of such devices in various lighting applications and apparatus. In general, a lamp or a fixture that uses a solid state light source operates in a fundamentally different way than a lamp or a fixture that uses an incandescent light source or a gas discharge light source. The primary difference in operation is that a lighting apparatus with a solid state light source operates on drive circuitry (also referred to throughout as a driver and/or driver circuit and/or driver circuitry) that is designed to drive the particular type of solid state light source being used, such as but not limited to one or more high-power LEDs.

The driver circuitry for a lighting apparatus using a solid state light source typically converts an alternating current (AC) input, such as a 120V/60 Hz line input, to a stable direct current (DC) voltage. Such circuitry typically includes a rectifier, or equivalent circuitry, and a DC-DC converter circuit, or equivalent circuitry. The rectifier receives the AC input and provides an unregulated DC output. The DC-DC converter circuit receives the unregulated DC output from the rectifier and provides a stable, regulated DC output to the solid state light source.

A variety of DC-DC converter circuit configurations are well-known in the art. Certain types of known DC-DC converter circuit configurations, such as but not limited to buck converters, boost converters, buck-boost converters, etc., are generally categorized as switching regulators. These devices include a switch, e.g. a transistor, which is selectively operated to allow energy to be stored in an energy storage device, e.g. an inductor, and then transferred to one or more filter capacitors. The one or more filter capacitors provide a relatively smooth DC output voltage to the load (i.e., the solid state light source) and provide essentially continuous energy to the load between energy storage cycles.

SUMMARY

Conventional switching regulator configurations typically have no protective isolation between the unregulated DC voltage and the regulated DC output voltage. In some configurations, the unregulated DC voltage may be 400 Volts or more. The unregulated DC voltage may be dangerous (i.e., cause damage or destruction) if inadvertently applied to the load. Further, conventional switching regulator configurations typically involve a pulsed current draw from the AC power source in a manner that results in a less than optimum power factor. The power factor of a system is defined as the ratio of the real power flowing to the load to the apparent power, and is a number between 0 and 1 (or is expressed as a percentage, e.g. 0.5 pf=50% pf). The real power is the actual power drawn by the load. The apparent power is the product of the current and voltage applied to the load. For systems with purely resistive loads, the voltage and current waveforms are in phase, changing polarity at the same instant in each cycle. Such systems have a power factor of 1.0, which is commonly referred to as "unity power factor." Where reactive loads are present, such as with loads including capacitors, inductors, or transformers, energy storage in the load results in a time difference between the current and voltage waveforms. This stored energy returns to the source and is not available to do work at the load. Systems with reactive loads often have less than a unity power factor. A circuit with a low power factor will use higher currents to transfer a given quantity of real power than a circuit with a high power factor.

Further, in typical solid state light source driver circuits, there is a design tradeoff between output ripple current versus capacitance. A high output ripple current may result in a noticeable flicker in the load (i.e., solid state light source or sources), an undesirable outcome particularly for lighting apparatus intended for constant illumination. This ripple current may be reduced by increasing output bulk capacitance. However, increasing the output bulk capacitance results in decreased power efficiency as well as greater cost, both of which are also undesirable.

Generally, embodiments described herein overcome the above described issues by providing driver circuitry for a solid state light source based lighting apparatus, where the driver circuitry provides constant current output with low current ripple, reduced bulk capacitance, and power factor correction. The lighting apparatus may be a lamp and/or a fixture and/or combinations thereof. The solid state light source may be a single source or a plurality of sources, and may include one or more light emitting diodes (LEDs), organic light emitting diodes (OLEDs), polymer light emitting diodes (PLEDs), and the like, including various combinations thereof. The driver circuitry is configured as a resonate driver and may be further configured as a half bridge resonate driver. Power efficiency may be increased by controlling the switching frequency of the half bridge inverter through feedback from an output stage, and by maintaining zero voltage switching on the inverter switches.

In an embodiment, there is provided a driver circuit. The driver circuit includes: a rectifier circuit configured to receive an AC input voltage and provide an unregulated DC voltage; an inverter circuit having a first switch and a second switch, the inverter circuit configured to receive a first gate control signal and a second gate control signal to open and close the first switch and the second switch, respectively, to generate a resonate AC signal from the unregulated DC voltage; a transformer comprising: a primary winding coupled to the inverter circuit; a secondary winding configured to be coupled, through an output stage circuit, to a solid state light source; and a feedback winding; a power factor correction circuit configured to control the inverter circuit in response to a first signal representative of the unregulated DC voltage and a second signal representative of current through the inverter circuit; and a frequency control circuit configured to generate the first gate control signal and the second gate control signal to control a switching frequency of the inverter circuit in response to a third signal representative of current though the output stage circuit and a fourth signal representative of current through the feedback winding.

In a related embodiment, the driver circuit may further include a zero voltage switching (ZVS) circuit configured to adjust timing of the first gate control signal and the second gate control signal, such that the first switch and the second switch close at a nominally zero drain to source voltage. In a further related embodiment, the ZVS circuit may be further configured to adjust the timing of the first gate control signal and the second gate control signal in response to a fifth signal representative of current through the primary winding.

In another related embodiment, the third signal may be optically coupled from the output stage circuit to the frequency control circuit. In yet another related embodiment, the frequency control circuit may be configured to adjust the switching frequency of the inverter circuit to reduce current ripple in the output stage circuit. In still another related embodiment, current in the output stage circuit may increase in response to a decrease in the switching frequency and current in the output stage circuit may decrease in response to an increase in the switching frequency.

In another embodiment, there is provided a method of driving a solid state light source. The method includes: receiving an AC input voltage; converting, within a rectifier circuit, the received AC input voltage to an unregulated DC voltage; generating a resonate AC signal within an inverter circuit from the unregulated DC voltage, wherein generating comprises: receiving a first gate control signal and a second gate control signal; and opening and closing a first switch and a second switch of the inverter circuit based on the received first gate control signal and the received second gate control signal, respectively; controlling the generation of the resonate AC signal within the inverter circuit in response to a first signal representative of the unregulated DC voltage and a second signal representative of current through the inverter circuit; coupling the resonate AC signal to a primary winding and a secondary winding of a transformer, wherein the transformer is connected to the inverter circuit; converting the coupled resonate AC signal to a regulated DC output; and outputting, via an output stage circuit, the regulated DC output to drive the solid state light source.

In a related embodiment, the method may further include adjusting timing of the first gate control signal and the second gate control signal via a zero voltage switching (ZVS) circuit, such that the first switch and the second switch close at a nominally zero drain to source voltage. In a further related embodiment, the method may further include adjusting, via the ZVS circuit, the timing of the first gate control signal and the second gate control signal, in response to a fifth signal representative of current through the primary winding.

In another related embodiment, the method may further include: generating the first gate control signal and the second gate control signal, in a frequency control circuit, in response to a third signal representative of current through the output stage circuit and a fourth signal representative of current through a feedback winding of the transformer, so as to control a switching frequency of the inverter circuit.

In a further related embodiment, the method may further include optically coupling the third signal from the output stage circuit to the frequency control circuit. In another further related embodiment, the method may further include adjusting, via the frequency control circuit, the switching frequency of the inverter circuit to reduce current ripple in the output stage circuit. In still another further related embodiment, the method may further include increasing current in the output stage in response to a decrease in the switching frequency; and decreasing current in the output stage in response to an increase in the switching frequency.

In another embodiment, there is provided a solid state light source assembly. The solid state light source assembly includes: a housing; a solid state light source disposed within the housing; and a driver circuit disposed within the housing, the driver circuit comprising: a rectifier circuit configured to receive an AC input voltage and provide an unregulated DC voltage; an inverter circuit having a first and a second switch, the inverter circuit further configured to receive a first and a second gate control signal to open and close the first and the second switch, respectively, to generate a resonate AC signal from the unregulated DC voltage; a transformer comprising: a primary winding coupled to the inverter circuit; a secondary winding configured to be coupled, through an output stage circuit, to the solid state light source; and a feedback winding; a power factor correction circuit configured to control the inverter circuit in response to a first signal representative of the unregulated DC voltage and a second signal representative of current through the inverter circuit; and a frequency control circuit configured to generate the first and the second gate control signals to control a switching frequency of the inverter circuit in response to a third signal representative of current though the output stage circuit and a fourth signal representative of current through the feedback winding.

In a related embodiment, the driver circuit may further include a zero voltage switching (ZVS) circuit configured to adjust timing of the first gate control signal and the second gate control signal, such that the first switch and the second switch close at a nominally zero drain to source voltage. In a further related embodiment, the ZVS circuit may be configured to adjust the timing in response to a fifth signal representative of current through the primary winding.

In another related embodiment, the third signal may be optically coupled from the output stage circuit to the frequency control circuit. In yet another related embodiment, the frequency control circuit may be configured to adjust the switching frequency of the inverter circuit to reduce current ripple in the output stage circuit. In still another related embodiment, current in the output stage circuit may increase in response to a decrease in the switching frequency and current in the output stage circuit may decrease in response to an increase in the switching frequency.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
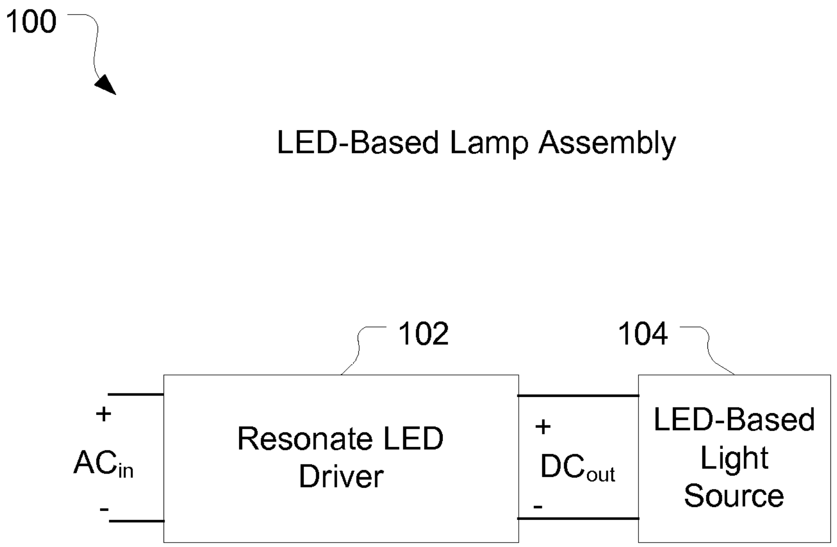
FIG. 1 is a simplified block diagram of a solid state light source assembly according to embodiments disclosed herein.

FIG. 1 shows a block diagram of a solid state light source assembly 100 according to embodiments described herein. The solid state light source assembly 100 includes a resonate driver circuit 102 that receives an alternating current (AC) input $AC_{in}$, and provides a regulated direct current (DC) output $DC_{out}$ to drive a solid state light source, such as but not limited to an LED-based light source 104. The LED-based light source 104 may be, but is not limited to, a single LED or multiple LEDs interconnected in series and/or parallel configurations. In some embodiments, $AC_{in}$ may be provided directly from a 120VAC/60 Hz line source. Alternatively, or additionally, $AC_{in}$ may be provided from any type of AC source, such as but not limited to a 220-240 VAC at 50-60 Hz.

The resonate driver circuit 102 converts the AC input voltage $AC_{in}$ to a regulated DC output voltage $DC_{out}$ with a high power factor, high efficiency and low current ripple. In some embodiments, the resonate driver circuit 102 and the LED-based light source 104 are provided within a single housing to create the solid state light source assembly 100. The solid state light source assembly 100, in some embodiments, comprises a lamp. Alternatively, or additionally, in some embodiments, the solid state light source assembly 100 comprises a luminaire and/or fixture. A solid state light source assembly 100 including an LED-based light source 104 provides long life and low power consumption compared to those including non-LED-based light sources.

Figure 2:
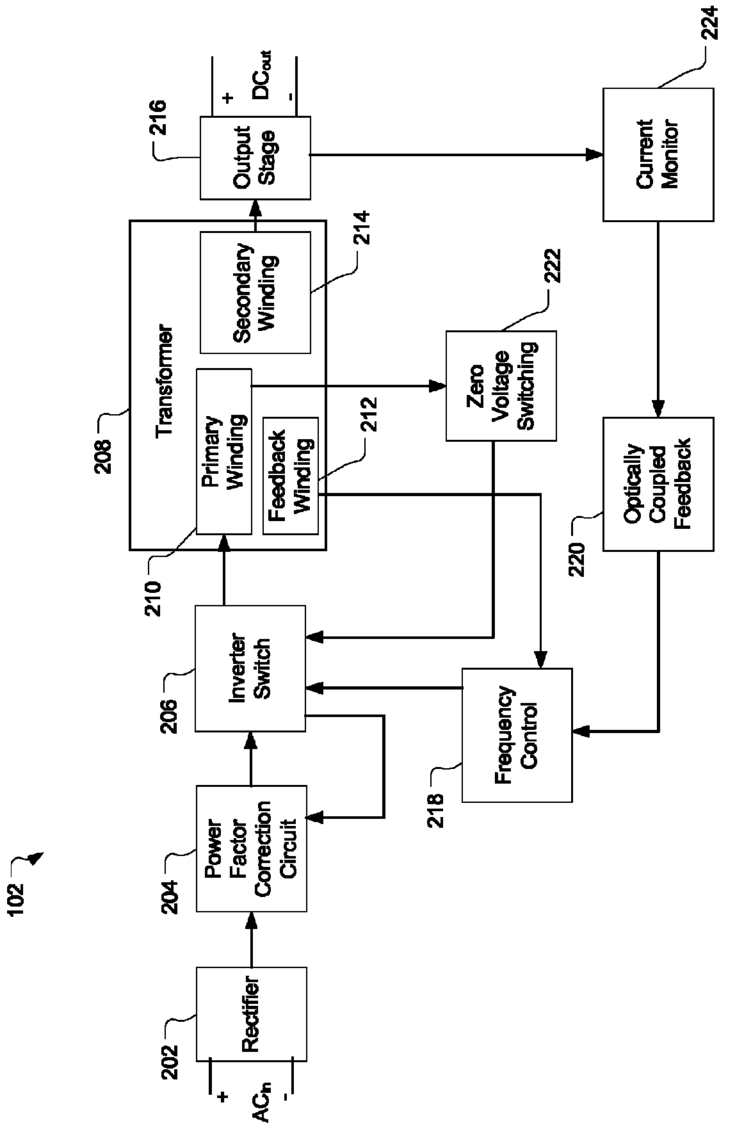
FIG. 2 is a block diagram of a resonate driver circuit according to embodiments disclosed herein.

FIG. 2 is a block diagram of the resonate driver circuit 102. The driver circuit 102 includes a rectifier 202, a power factor correction circuit 204, an inverter switch 206, a transformer 208, and an output stage circuit 216. The transformer 208 includes including a primary winding 210, a secondary winding 214, and a feedback winding 212. The output stage circuit 216 is coupled to the secondary winding 214 of the transformer 208. The driver circuit 102, in some embodiments, includes a zero voltage switching (ZVS) circuit 222 and a frequency control circuit 218, which may be optically coupled in a feedback loop 220 from a current monitor 224 of the output stage 216.

The AC input voltage $AC_{in}$, is coupled to the rectifier circuit 202. The rectifier circuit 202 is configured to rectify (i.e., convert) $AC_{in}$, to provide an unregulated DC output voltage, i.e. a DC output voltage that follows instantaneous variations in the AC input voltage. In some embodiments, the rectifier circuit 202 may include, but is not limited to, a bridge rectifier. The rectifier 202, at its output, is coupled to the primary winding 210 of the transformer 208 through the inverter switch 206 under the control of the power factor correction circuit 204, the frequency control circuit 218 and the zero voltage switching circuit 222. The inverter switch 206, in some embodiments, may be but is not limited to a half bridge inverter including a complementary pair of switching transistors. In general, the inverter switch 206 converts the unregulated DC output voltage from the rectifier circuit 202 to a frequency controlled AC voltage coupled to the primary winding 210 of the transformer 208. Energy stored in the secondary winding 214 is coupled to the output stage 216. The output stage 216 may, in some embodiments, include a rectifier and a low pass filter (not shown in FIG. 2) to convert the AC voltage from the secondary winding 214 to a DC output voltage. The low pass filter, in some embodiments, may include a resistor and capacitor (RC) network.

The power factor correction circuit 204 is configured to provide an output to the inverter switch 206 so as to control the switch in response to a signal representative of current through the inverter switch 206 and a signal representative of the unregulated DC voltage. The output from the power factor correction circuit 204 controls the inverter switch 206 so that the current to the LED-based light source 104 has a waveform that substantially matches and is in phase with the output of the rectifier circuit 202, thereby providing a high power factor.

The ZVS circuit 222 is configured to provide an output to the inverter switch 206 to control the switching times of the complementary pair of switching transistors within the inverter switch 206 in response to a signal representative of current in the primary winding 210 of the transformer 208. The ZVS circuit 222 controls the switching times so that the complimentary pair of switching transistors close at a time when the drain to source voltage of the transistors is substantially zero volts.

The current monitor circuit 224 is configured to monitor current in the output stage circuit 216 associated with the DC output voltage. In embodiments where the output stage circuit 216 includes an RC network, the current monitor 224 monitors current in the RC network. The current monitor circuit 224 provides an output through the optically coupled feedback path 220 to the frequency control circuit 218. The frequency control circuit 218 is configured to provide an output to the inverter switch 206 for controlling the switch frequency in response to the optically coupled feedback signal from the current monitor 224 and a signal representative of current in the feedback winding 212 of the transformer 208. The switching frequency may be controlled to adjust the current level and reduce current ripple in the output stage 216. In some embodiments, the current level in the output stage circuit 216 increases in response to a decrease in the switching frequency and decreases in response to an increase in the switching frequency. The signal representative of current in the feedback winding 212 may be used to adjust the bias supply of the frequency control circuit 218 to improve transient response of the frequency control circuit. The frequency control circuit 218 may also be configured to prevent both switches in the inverter switch 206 from closing at the same time, resulting in a short circuit to ground such as a crowbar current.

Figure 3:
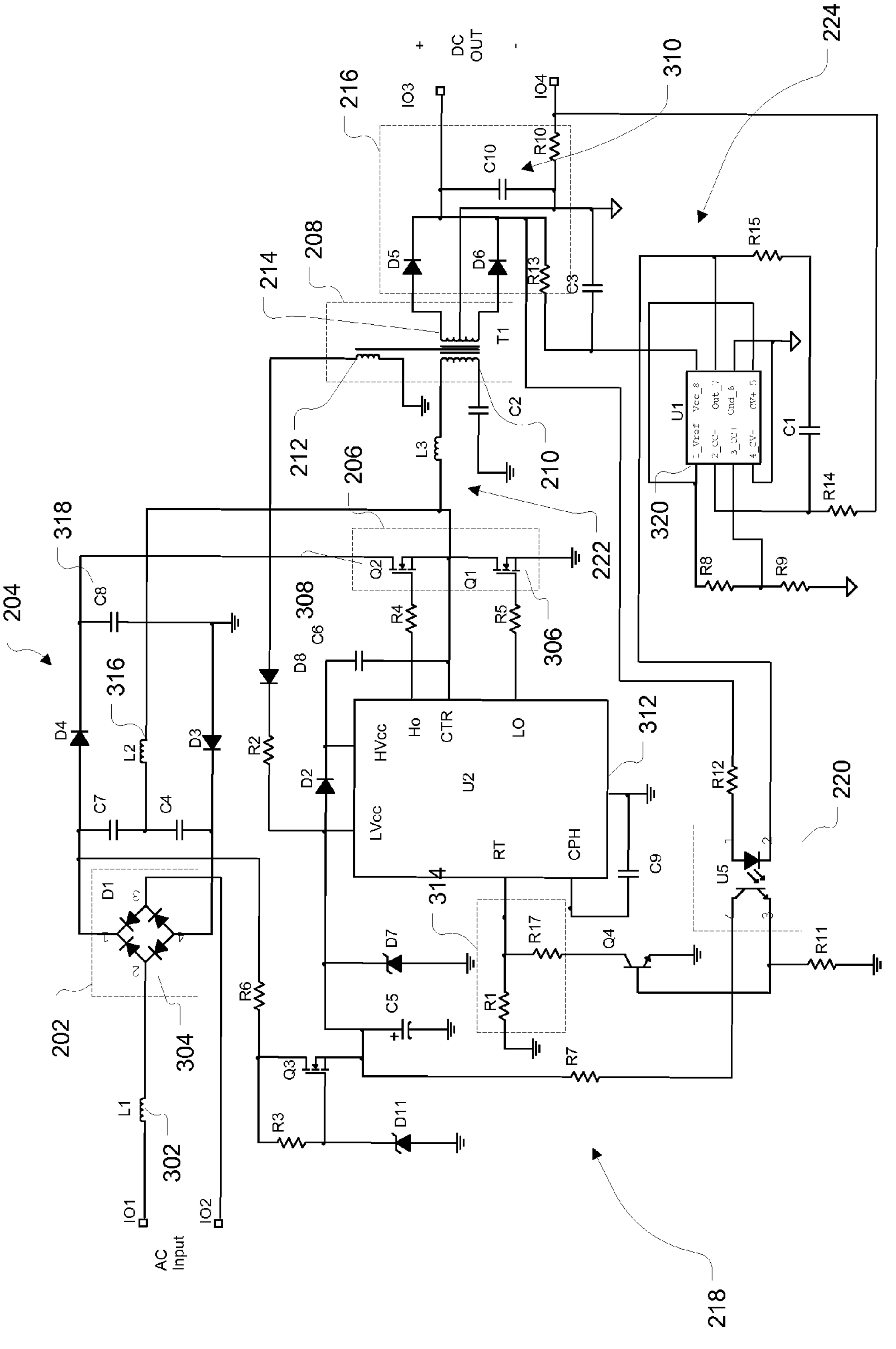
FIG. 3 is a circuit diagram of a resonate driver circuit according to embodiments disclosed herein.

FIG. 3 is a circuit diagram of the driver circuit 102. The driver circuit 102 as shown in FIG. 3 includes a rectifier circuit 202, a power factor correction circuit 204, an inverter switch 206, a transformer 208 including a primary winding 210, secondary winding 214 and a feedback winding 212, and an output stage circuit 216 coupled to the secondary winding 214 of the transformer 208. The driver circuit 102 may, and in some embodiments does, include a zero voltage switching (ZVS) circuit 222 and a frequency control circuit 218, which may be optically coupled in a feedback loop 220 from a current monitor 224 of the output stage 216.

The AC input voltage $AC_{in}$ is coupled to the rectifier circuit 202. The rectifier circuit 202 may be configured to rectify $AC_{in}$ to provide an unregulated DC output voltage, i.e. a DC output voltage that follows instantaneous variations in the AC input voltage. In some embodiments, for example, the rectifier circuit 202 may include a full bridge rectifier such as but not limited to a diode configuration D1 304. An inductor L1 302 may be employed to filter line noise on the AC input voltage $AC_{in}$.

The output of the rectifier circuit 202 is coupled to the primary winding 210 of the transformer 208 through the inverter switch 206, under the control of the power factor correction circuit 204, the frequency control circuit 218, and the zero voltage switching circuit 222. The inverter switch 206, in some embodiments, may be but is not limited to a half bridge inverter including a complementary pair of switching transistors Q1 306 and Q2 308, as shown in FIG. 3. In general, the inverter switch 206 converts the unregulated DC output voltage to a frequency controlled AC voltage coupled to the primary winding 210 of the transformer 208. The energy stored in the secondary winding 214 is coupled to the output stage 216. The output stage 216 may, and in some embodiments does, include a rectifier, D5 and D6, and a low pass filter to convert the AC voltage from the secondary winding 214 to the DC output voltage. The low pass filter may, and in some embodiments does, include a resistor and capacitor (RC) network 310.

The power factor correction circuit 204 is configured to provide an output to the inverter switch 206 so as to control the switch in response to a signal representative of current through the inverter switch 206 and a signal representative of the unregulated DC voltage. The output from the power factor correction circuit 204 may control the inverter switch 206 so that the current to the LED-based light source 104 has a waveform that substantially matches and is in phase with the output of the rectifier 202, thereby providing a high power factor. The power factor is improved by increasing the current in an inductor L2 316. When the switch Q1 306 closes, the current in the inductor L2 316 increases. When the switch Q1 306 opens, this stored energy in the inductor L2 316 is transferred to a capacitor C8 318 through the switch Q2 308.

The ZVS circuit 222 is configured to provide an output to the inverter switch 206 for controlling the switching times of the complementary pair of switching transistors in response to a signal representative of current in the primary winding 210 of the transformer 208. The ZVS circuit 222 may control the switching times so that the switches close at a time when the drain to source voltage of the transistors is nominally zero volts. The timing is determined by an inductor L3, a capacitor C2, and leakage inductance of the secondary winding 214 of the transformer 208.

The current monitor circuit 224 is configured to monitor current in the RC network 310 of the output stage circuit 216 associated with the DC output voltage. The current monitor circuit 224 may, and in some embodiments does, provide an output through the optically coupled feedback path 220 to the frequency control circuit 218. The current monitor circuit 224 may, and in some embodiments does, employ an integrated circuit U1 320 that regulates the output current as part of a feedback loop between an internal voltage reference and an operational amplifier. As the loop gain for the operational amplifier increases, the output current ripple decreases. The integrated circuit U1 320 may be, for example, but is not limited to an ST Microelectronics® TSM 1017 voltage and current controller. Those of ordinary skill in the art will recognize, however, that other known controllers may be used in place of the TSM 1017 controller shown in FIG. 3.

The frequency control circuit is configured to provide an output to the inverter switch 206 for controlling the switch frequency in response to the optically coupled feedback signal from the current monitor 224 and a signal representative of current in the feedback winding 212 of the transformer 208. The frequency control circuit 218 may, and in some embodiments does, employ an integrated circuit U2 312 which sets an initial frequency based on a resistor network R1, R17 314. After an initialization phase, the frequency is controlled by current drain from the RT terminal of the integrated circuit U2 312, which is tied to the feedback signal from the optical coupler U5 220. The switching frequency may be controlled to adjust the current level and reduce current ripple in the output stage circuit 216. In some embodiments, the current level in the output stage circuit 216 increases in response to a decrease in the switching frequency and decreases in response to an increase in the switching frequency. The integrated circuit U2 312 may be, for example, but is not limited to a Fairchild Semiconductor® FAN7711 Ballast Control Integrated Circuit. Those of ordinary skill in the art will recognize, however, that other known controllers may be used in place of the FAN7711 controller shown in FIG. 3. The signal representative of current in the feedback winding 212 may be, and in some embodiments is, used to adjust the bias supply of the integrated circuit U2 312 of the frequency control circuit 218, through a diode D8 and a resistor R2, to improve transient response of the frequency control circuit.

In some embodiments, the frequency control circuit 218 may also be configured to prevent both switches in the inverter switch 206 from closing at the same time, resulting in a short circuit to ground known as a crowbar current. This may be accomplished by programming the integrated circuit U2 312 to maintain a suitable dead time between switch closings for the switches Q1 and Q2.

A driver circuit according to embodiments described herein may be configured for operation with a variety of input voltages based on appropriate selection of various circuit components thereof. Table 1 below identifies one example of circuit components useful in configuring the embodiment illustrated in FIG. 3 for operation with a 120V RMs/60 Hz AC input signal (resistor values in ohms):

TABLE 1

| Component | Descriptor/Value |
|---|---|
| ACin | 120 VAC/60 Hz |
| C2 | 72 nF |
| C3 | 1 uF |
| C4 | 220 nF |
| C5 | 22 uF |
| C6 | 100 nF |
| C7 | 220 nF |
| C8 | 22 uF |
| C10 | 100 uF |
| L1 | 1.5 mH |
| L2 | 360 uH |
| L3 | 166 uH |
| Q1 | IRF1225 |
| Q2 | IRF1225 |
| Q3 | 4N60 |
| Q4 | 2SC584500 |
| R1 | 82k |
| R2 | 100 |
| R3 | 1M |
| R4 | 68 |
| R5 | 68 |
| R6 | 10.7k |
| R7 | 1k |
| R8 | 1.5k |
| R9 | 820 |
| R10 | 1.6 |
| R12 | 4.7k |
| R13 | 1.5k |
| R14 | 1k |
| R17 | 47k |
| U1 | TSM1017 |
| U2 | FAN7711 |
| U5 | TLP181 |

FIGS. 4, 5, 6A, and 6B are flowcharts of various methods 400, 500, 600 of driving a solid state light source, such as but not limited to an LED-based light source. The flowcharts illustrate the functional information one of ordinary skill in the art requires to fabricate circuits or to generate computer software to perform the processing required in accordance with the present invention. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 4:
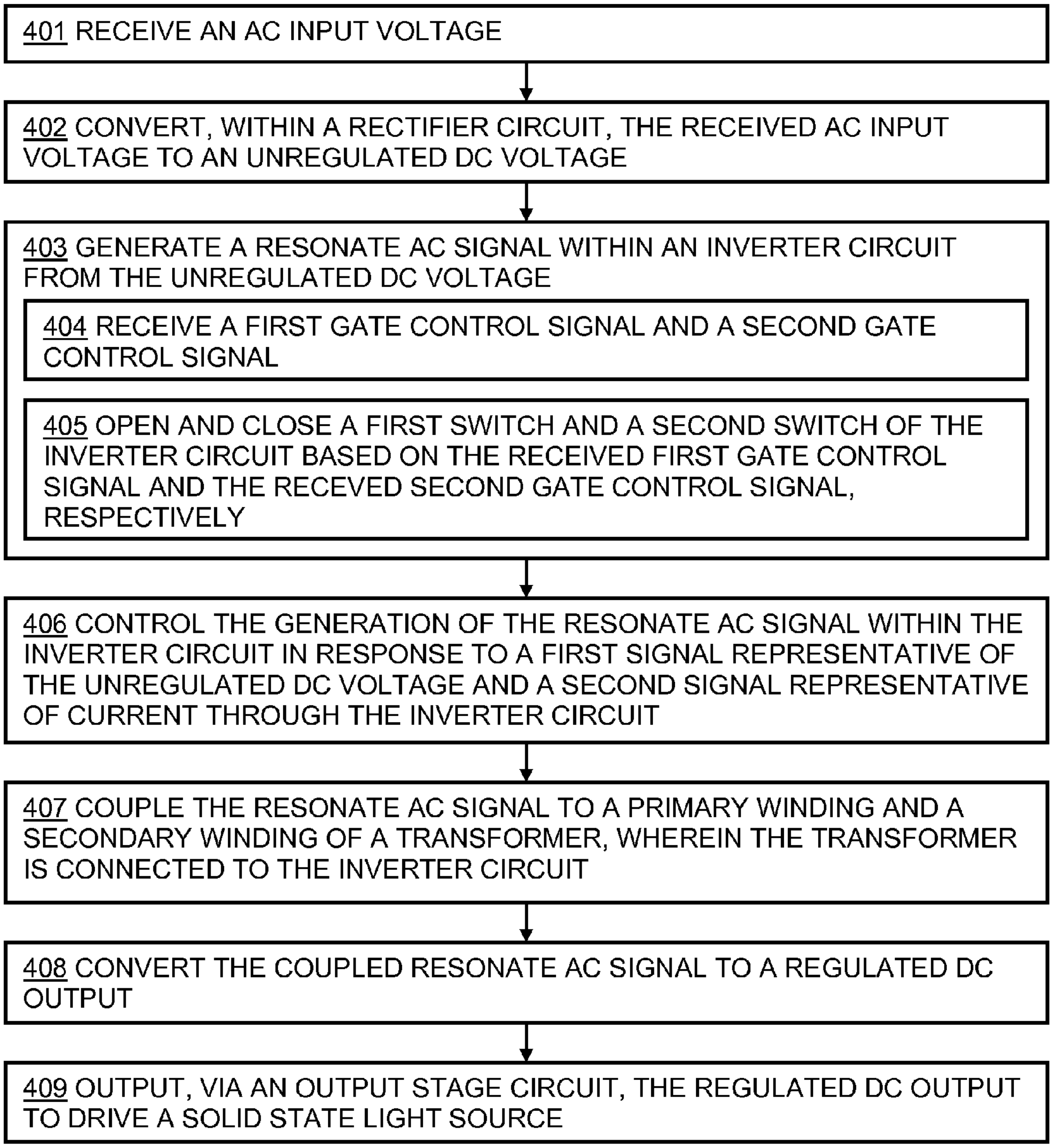
FIGS. 4-6 are block flow diagrams of methods of driving a solid state light source according to embodiments disclosed herein.
Figure 5:
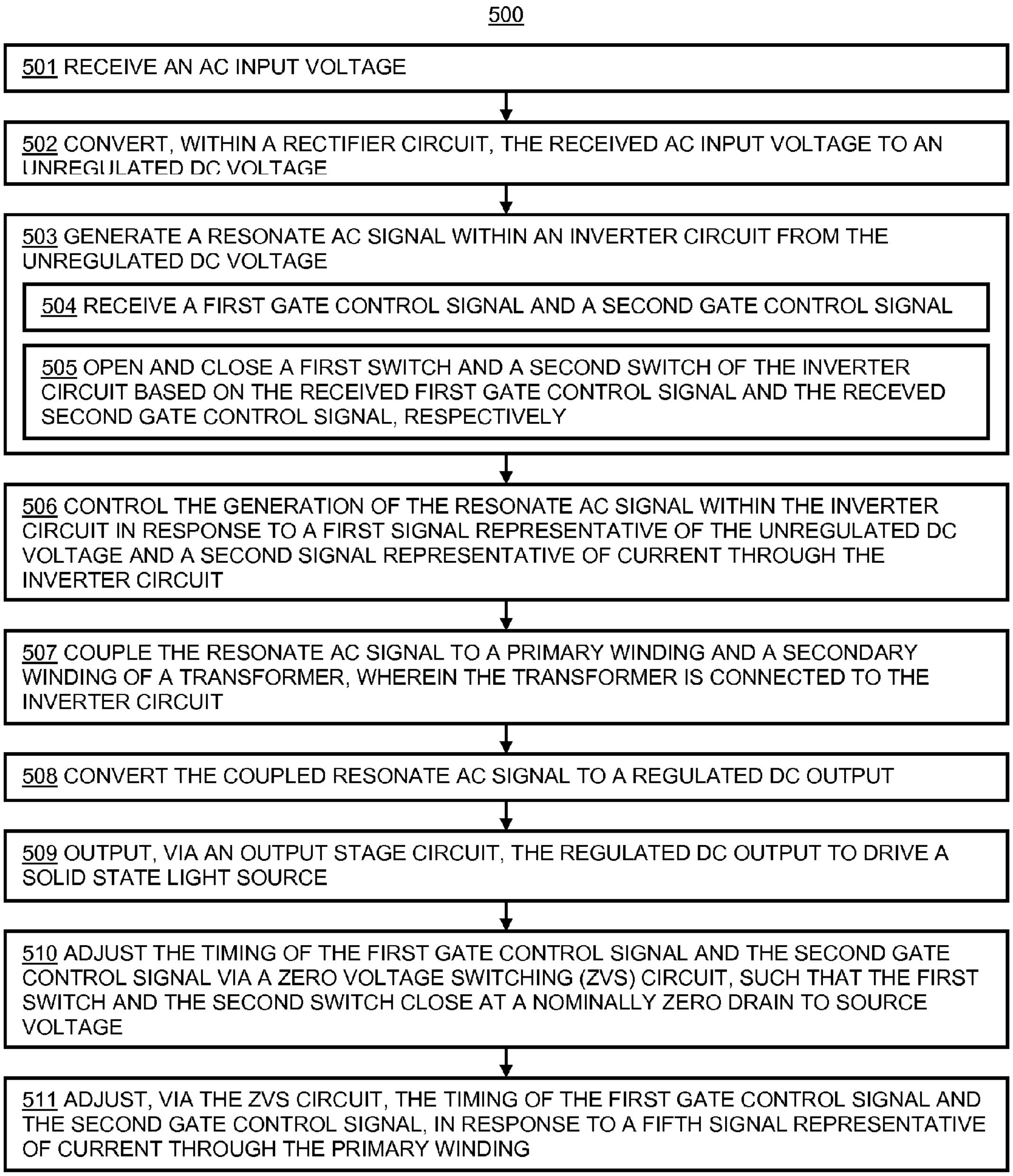

More particularly, FIGS. 4, 5, and 6 show various methods 400, 500, and 600 of driving a solid state light source. First, an AC input voltage is received, step 401/501/601. The received AC input voltage is the converted, within a rectifier circuit, to an unregulated DC voltage, step 402/502/602. A resonate AC signal is generated within an inverter circuit from the unregulated DC voltage, step 403/503/603. The resonate AC signal is generated by receiving a first gate control signal and a second gate control signal, step 404/504/604, and then opening and closing a first switch and a second switch of the inverter circuit based on the received first gate control signal and the received second gate control signal, respectively, step 405/505/605.

The generation of the resonate AC signal within the inverter circuit is controlled in response to a first signal representative of the unregulated DC voltage and a second signal representative of current through the inverter circuit, step 406/506/606. The resonate AC signal is then coupled to a primary winding and a secondary winding of a transformer, step 407/507/607, wherein the transformer is connected to the inverter circuit. The coupled resonate AC signal is converted to a regulated DC output, step 408/508/608. Finally, the regulated DC output is output, via an output stage circuit, to drive the solid state light source, step 409/509/609.

The method 500 shown in FIG. 5 also includes adjusting timing of the first gate control signal and the second gate control signal via a zero voltage switching (ZVS) circuit, step 510, such that the first switch and the second switch close at a nominally zero drain to source voltage. The method 500 further includes adjusting, via the ZVS circuit, the timing of the first gate control signal and the second gate control signal, in response to a fifth signal representative of current through the primary winding, step 511.

Figure 6A:
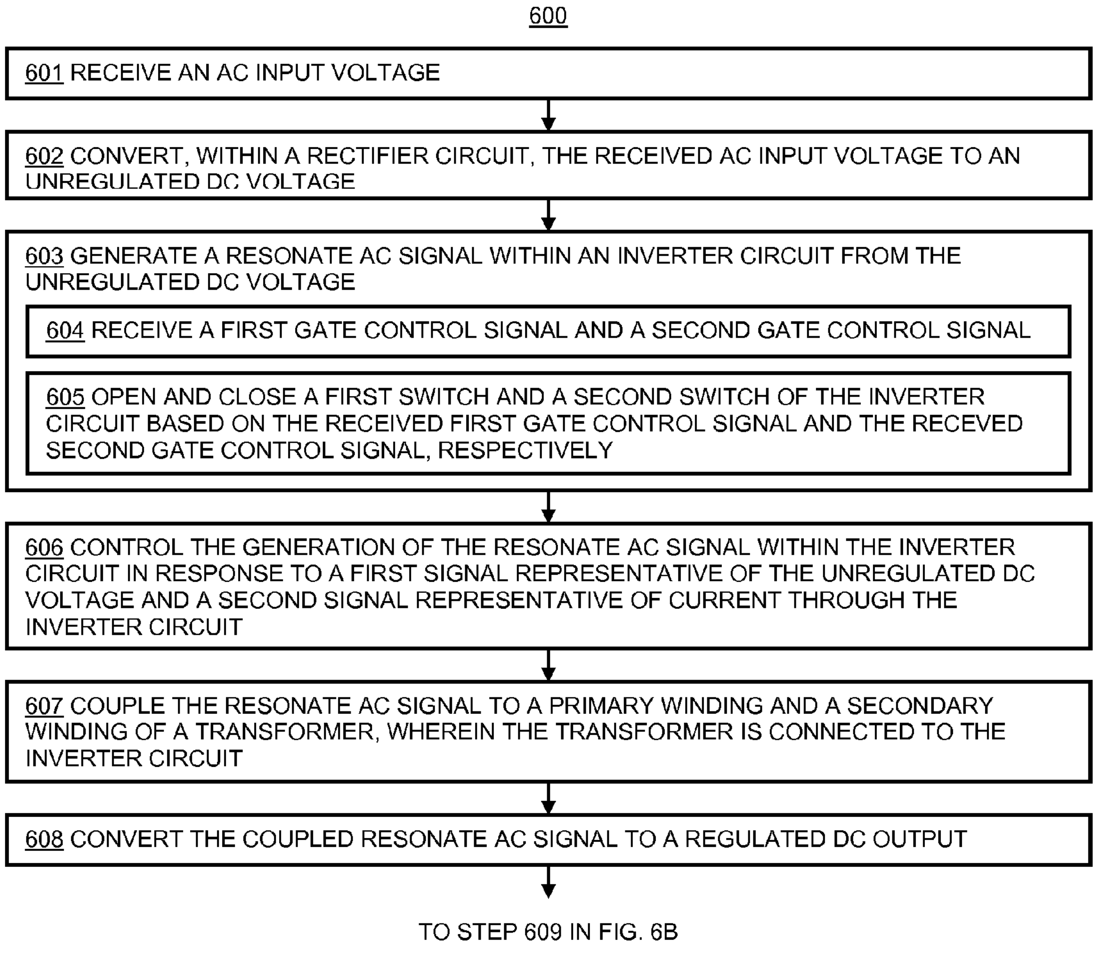
Figure 6B:
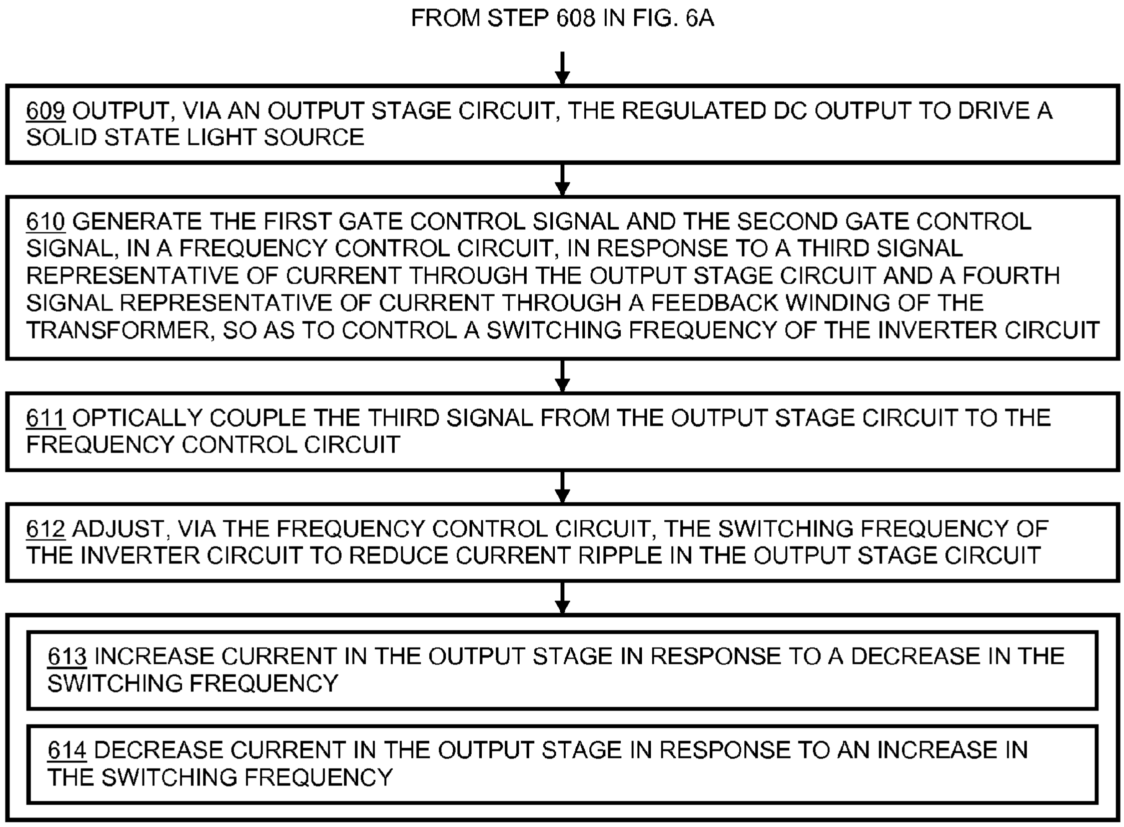

The method 600 shown in FIGS. 6A and 6B also include generating the first gate control signal and the second gate control signal, in a frequency control circuit, in response to a third signal representative of current through the output stage circuit and a fourth signal representative of current through a feedback winding of the transformer, so as to control a switching frequency of the inverter circuit, step 610. The method 600 further includes optically coupling the third signal from the output stage circuit to the frequency control circuit, step 611, as well as adjusting, via the frequency control circuit, the switching frequency of the inverter circuit to reduce current ripple in the output stage circuit, step 612. Finally, the method 600 also includes increasing current in the output stage in response to a decrease in the switching frequency, step 613, and decreasing current in the output stage in response to an increase in the switching frequency, step 614.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A driver circuit comprising:

a rectifier circuit configured to receive an AC input voltage and provide an unregulated DC voltage;

an inverter circuit having a first switch and a second switch, the inverter circuit configured to receive a first gate control signal and a second gate control signal to open and close the first switch and the second switch, respectively, to generate a resonate AC signal from the unregulated DC voltage;

a transformer comprising:

a primary winding coupled to the inverter circuit;

a secondary winding configured to be coupled, through an output stage circuit, to a solid state light source; and a feedback winding;

a power factor correction circuit configured to control the inverter circuit in response to a first signal representative of the unregulated DC voltage and a second signal representative of current through the inverter circuit; and a frequency control circuit configured to generate the first gate control signal and the second gate control signal to control a switching frequency of the inverter circuit in response to a third signal representative of current though the output stage circuit and a fourth signal representative of current through the feedback winding.

2. The driver circuit of claim 1, further comprising a zero voltage switching (ZVS) circuit configured to adjust timing of the first gate control signal and the second gate control signal, such that the first switch and the second switch close at a nominally zero drain to source voltage.

3. The driver circuit of claim 2, wherein the ZVS circuit is further configured to adjust the timing of the first gate control signal and the second gate control signal in response to a fifth signal representative of current through the primary winding.

4. The driver circuit of claim 1, wherein the third signal is optically coupled from the output stage circuit to the frequency control circuit.

5. The driver circuit of claim 1, wherein the frequency control circuit is configured to adjust the switching frequency of the inverter circuit to reduce current ripple in the output stage circuit.

6. The driver circuit of claim 1, wherein current in the output stage circuit increases in response to a decrease in the switching frequency and current in the output stage circuit decreases in response to an increase in the switching frequency.

7. A method of driving a solid state light source, comprising:

receiving an AC input voltage;

converting, within a rectifier circuit, the received AC input voltage to an unregulated DC voltage;

generating a resonate AC signal within an inverter circuit from the unregulated DC voltage, wherein generating comprises:

receiving a first gate control signal and a second gate control signal; and opening and closing a first switch and a second switch of the inverter circuit based on the received first gate control signal and the received second gate control signal, respectively;

controlling the generation of the resonate AC signal within the inverter circuit in response to a first signal representative of the unregulated DC voltage and a second signal representative of current through the inverter circuit;

coupling the resonate AC signal to a primary winding and a secondary winding of a transformer, wherein the transformer is connected to the inverter circuit;

converting the coupled resonate AC signal to a regulated DC output; and outputting, via an output stage circuit, the regulated DC output to drive the solid state light source.

8. The method of claim 7, further comprising:

adjusting timing of the first gate control signal and the second gate control signal via a zero voltage switching (ZVS) circuit, such that the first switch and the second switch close at a nominally zero drain to source voltage.

9. The method of claim 8, further comprising:

adjusting, via the ZVS circuit, the timing of the first gate control signal and the second gate control signal, in response to a fifth signal representative of current through the primary winding.

10. The method of claim 7, further comprising:

generating the first gate control signal and the second gate control signal, in a frequency control circuit, in response to a third signal representative of current through the output stage circuit and a fourth signal representative of current through a feedback winding of the transformer, so as to control a switching frequency of the inverter circuit.

11. The method of claim 10, further comprising:

optically coupling the third signal from the output stage circuit to the frequency control circuit.

12. The method of claim 10, further comprising:

adjusting, via the frequency control circuit, the switching frequency of the inverter circuit to reduce current ripple in the output stage circuit.

13. The method of claim 10, further comprising:

increasing current in the output stage in response to a decrease in the switching frequency; and decreasing current in the output stage in response to an increase in the switching frequency.

14. A solid state light source assembly comprising:

a housing;

a solid state light source disposed within the housing; and a driver circuit disposed within the housing, the driver circuit comprising:

a rectifier circuit configured to receive an AC input voltage and provide an unregulated DC voltage;

an inverter circuit having a first and a second switch, the inverter circuit further configured to receive a first and a second gate control signal to open and close the first and the second switch, respectively, to generate a resonate AC signal from the unregulated DC voltage;

a transformer comprising:

a primary winding coupled to the inverter circuit;

a secondary winding configured to be coupled, through an output stage circuit, to the solid state light source; and a feedback winding;

a power factor correction circuit configured to control the inverter circuit in response to a first signal representative of the unregulated DC voltage and a second signal representative of current through the inverter circuit; and a frequency control circuit configured to generate the first and the second gate control signals to control a switching frequency of the inverter circuit in response to a third signal representative of current though the output stage circuit and a fourth signal representative of current through the feedback winding.

15. The solid state light source assembly of claim 14, wherein the driver circuit further comprising a zero voltage switching (ZVS) circuit configured to adjust timing of the first gate control signal and the second gate control signal, such that the first switch and the second switch close at a nominally zero drain to source voltage.

16. The solid state light source assembly of claim 15, wherein the ZVS circuit is configured to adjust the timing in response to a fifth signal representative of current through the primary winding.

17. The solid state light source assembly of claim 14, wherein the third signal is optically coupled from the output stage circuit to the frequency control circuit.

18. The solid state light source assembly of claim 14, wherein the frequency control circuit is configured to adjust the switching frequency of the inverter circuit to reduce current ripple in the output stage circuit.

19. The solid state light source assembly of claim 14, wherein current in the output stage circuit increases in response to a decrease in the switching frequency and current in the output stage circuit decreases in response to an increase in the switching frequency.

* * * * *